United States Patent [19]

Michelotti et al.

[11] Patent Number: 5,872,295
[45] Date of Patent: Feb. 16, 1999

[54] PURIFICATION OF HYDROXYLAMINE

[75] Inventors: Francis Michelotti, Easton; Irl E. Ward, Bethlehem, both of Pa.

[73] Assignee: Concept Sciences, Inc., Allentown, Pa.

[21] Appl. No.: 23,940

[22] Filed: Feb. 13, 1998

[51] Int. Cl.$^6$ .................................................. C07C 209/48

[52] U.S. Cl. ........................... 564/301; 564/497; 423/387

[58] Field of Search ..................................... 564/301, 497; 423/387

[56] References Cited

U.S. PATENT DOCUMENTS 5,338,522  8/1994  Heitner et al. ........................ 423/265

*Primary Examiner*—Brian M. Burn
*Attorney, Agent, or Firm*—John Lezdey & Assoc.

[57] ABSTRACT

The invention provides a method for purification of hydroxylamine so as to have a substantial reduction of cations and anions. The method involves passing a solution of hydroxylamine through at least one strong acid ion exchange bed which has been pretreated with dilute hydrochloric acid and then through at least one strong base anion exchange resin bed which has been pretreated or regenerated with a non-metal amino or hydroxide base solution.

14 Claims, No Drawings

PURIFICATION OF HYDROXYLAMINE

FIELD OF THE INVENTION

The present invention relates to a method for the purification of hydroxylamine. More particularly, there is provided a method of purifying aqueous solutions of hydroxylamine by means of ion exchange so as to have a low concentration of sodium, potassium and other metal ions. The invention further provides for the regeneration of the ion exchange resin.

BACKGROUND OF THE INVENTION

Hydroxylamine has found many uses in a variety of industries. In the pharmaceutical industry for the preparation of specialty drugs and in connection with stripping compositions for photoresists within the microelectronic industry it has found wide use. In both the pharmaceutical industry and for photoresist and residue removal treatment it is important that the product is free of metal cation and anion impurities.

The use of ion exchange for purifying hydroxylamines is well known. However, resin conditioning and regeneration in the purification process of the prior art has not dealt with the reduction of trace metals or the possibility of exothermic reactions resulting from the decomposition of hydroxylamine.

Additionally, the order of ion exchange is critical to maintaining stability of the hydroxylamine within the ion exchange cylinder. It has been found that anion exchange followed by cation exchange can lead to rapid decomposition of hydroxylamine and produce explosive consequences within the cation resin cylinder.

U.S. Pat. No. 4,147,623 of Koff et al., which is herein incorporated by reference, discloses the purification of hydroxylamine by ion exclusion which includes use of anion exchange resin in which hydroxylammonium salts are passed. The ion exchange resin is primarily utilized as a reaction source for the hydroxylamine salt neutralizer on a small scale rather than for separation of metal cation and anion impurities.

U.S. Pat. No. 4,202,765 to Koff et al., which is herein incorporated by reference, discloses the separation of hydroxylamine from a solution of hydroxylammonium salt through the use of a cation exchange resin. The process does not teach the removal of anions or the use of anion exchange resins.

U.S. Pat. No. 5,318,762 to Cawlfield et al. discloses treating solutions of hydroxylammonium salts containing excess acid by passing the solutions through a weak base ion exchange resin.

U.S. Pat. No. 4,166,842 discloses a process of extracting hydroxylammonium ions from a solution utilizing a cation exchange resin which included the further step of converting the hydroxylammonium ions to hydroxylamine.

None of the prior art teach the removal of cations and anions from hydroxylamine so as to produce a highly purified hydroxylamine having a low concentration of sodium, potassium, and other metal ions.

SUMMARY OF THE INVENTION

The present invention provides a method for the purification of hydroxylamine so that cations and anions, especially sodium, potassium, calcium, aluminum and iron ions which are normally present are greatly reduced. The process contains the steps which comprise:

A. Passing an aqueous solution of hydroxylamine through at least one macroporous or gel, strong acid cation exchange resin bed which has been previously treated or regenerated with a dilute hydrochloric acid solution to convert all active resin sites to the hydrogen form, and then B. Passing the solution from Step A through a strong base anion exchange resin bed that has been treated or regenerated with a non-metal amino or hydroxide base solution to convert all active resin sites to the hydroxyl form.

Preferably, the hydrochloric acid solution is about 5 to 20% by weight hydrochloric acid.

Preferred non-metal amino or hydroxide base compounds are the alkanolamines, hydroxylamine, tetraalkyl ammonium hydroxide and ammonium hydroxide.

Advantageously, there is utilized a plurality of cation exchange resin beds and a plurality of anion exchange resin beds so as to provide the necessary volume of resins for high purity and infrequent regeneration.

It is therefore an object of the invention to provide hydroxylamine solutions which are substantially free of sodium, potassium and other metal ions.

It is another object of the invention to provide a process for regenerating anion and cation exchange resins used in the purification of hydroxylamine.

It is a still further object of the invention to provide a purification system with a reduced hazard of explosion from rapid decomposition of hydroxylamine within the ion exchange cylinder.

DESCRIPTION OF THE PREFERRED EMBODIMENTS

According to the present invention, there is provided the purification of hydroxylamine whereby the resulting product has greatly reduced amounts of undesirable cations and anions. The invention provides a process whereby an aqueous solution of hydroxylamine is passed through at least one bed of a strong acid cation exchange resin and then at least one bed of a strong base anion exchange resin. It is essential in the invention that the cation exchange resin be pretreated with a dilute solution of hydrochloric acid so that all acid groups are in the $H^+$ form and to ensure that all metallic cations that may be present are extracted from the resin bed. The hydrochloric acid treatment is with a 3–20% hydrochloric acid solution, preferably, about 5–10% hydrochloric acid solution.

The strong base anion exchange resin is pretreated typically with deionized water or regenerated with a non-metal amino or a hydroxide base solution so as to remove any undesirable anions which may be present on the resin that can contaminate the hydroxylamine. Also, this ensures that the active sites of the resin are in the $OH^-$ form.

Using conventional methods of pretreatment of cationic exchange resins such as with dilute sulfuric acid does not produce the same results as found when dilute hydrochloric acid has been used to pretreat or regenerate the resin. In accordance with the invention, it is preferred to also pretreat the cation exchange resin with a dilute solution of hydroxylamine, such as a 5–40% aqueous solution, preferably, about 10–25% by weight solution of hydroxylamine before passing a 50% by weight solution of hydroxylamine through one or more beds of the cation exchange resins. An exothermic reaction is present when the hydroxylamine solution is first added to the cation exchange bed so that it is preferable to utilize a dilute hydroxylamine solution to condition the cation exchange resin by forming the hydroxylamine salt with the strong acid groups. The dilute hydroxylamine solution also has the effect of removing excess metal cations that were not effectively removed by the hydrochloric acid treatment, i.e., calcium. The 50% aqueous hydroxylamine solution if initially utilized generates a highly exothermic reaction with the cation exchange resin in producing the corresponding amine salt that is capable of affecting the resin bed. The exothermic reaction can also be controlled by a predetermined rate of introduction of the hydroxylamine solution. Once the amine salt has been formed and the isotherm subsides, the $Na^+$, $K^+$ and other cations in the 50% hydroxylamine solution exchange in the resin bed satisfactorily.

It has been found that the order or permutation of exchange of aqueous solutions of hydroxylamine is critical to stability of the hydroxylamine within the ion exchange column. The order of ion exchange of aqueous hydroxylamine solutions is also critical to the safe operation of the exchange system because rapid decomposition of the hydroxylamine can take place with a strong exothermic reaction. It is therefore important that the exchange order for the hydroxylamine solutions should not include anion exchange followed by cation exchange.

The non-metal amino or hydroxide base compounds which may be used to regenerate the anion exchange resin includes ammonium hydroxide solutions, tetraalkyl ammonium hydroxide solutions, for example, tetramethyl ammonium hydroxide, tetraethylammonium hydroxide, alkanolamines, for example, alkanolamines, monoethanolamine, isopropylamines, diethanolamine, 2-amino-1-propanol, 2-amino-2-ethoxy-propanol, etc., hydroxylamine solutions, and the like.

Most commercial ion exchange resins, both anionic and cationic, require an initial cleaning or conditioning prior to use. If the cleaning or conditioning is not performed, excessive metal extraction from the resin by hydroxylamine may take place. In the situation where the $Na^+/K^+$ values in the hydroxylamine are reduced but the calcium values increase, there is an indication that the resin is high in calcium ions initially and they are being removed by the hydroxylamine. This means that additional cleaning or conditioning of the resin is required.

Both gel type and macroporous type of ion exchange resins can be used in the present process. Preferred are the polystyrene and polyacrylic acid strong acid hydrogen form cationic exchangers and the strong base anion exchangers of the polystyrene or polyacrylic type and $OH^-$ form. Most preferred are the sulfonated polydivinylbenzene/styrene cationic resins and the tetramethylammonium hydroxide modified poly (divinylbenzene/styrene) copolymers as the anion exchange resins.

The weak acid type cation exchangers and the weak base anion exchangers either alone or in combination have been found less effective in reducing both the cation and anion impurities found in the hydroxylamine solutions which are commercially produced.

The anion exchange resins which may be utilized in the present invention include the Purolite anion exchange resins A-600, A-400, A-300, A-300E, A-400, A-850 and A-87, Rohm & Haas resins IRA-400, IRA-402, IRA-904 and IRA-93, Dow resins SBR, SAR, Dowex 66 and Dowex II, Ionac ASB-1, Duolite A-109 and the like in the $OH^-$ form.

Preferably, the 50% hydroxylamine solution is passed through a sufficient number (about 3–4) of the prepared cation exchange beds and anion exchange beds (about 3–4) so that the required quality of the hydroxylamine solution can be obtained without frequent regeneration. These last two parameters are controlled by the volume in cubic feet of the resin used within each ion exchange cylinder.

It is advantageous to add to the exchanged hydroxylamine solution an effective amount of a stabilizer.

Suitable stabilizers include a compound selected from the group consisting of cis-or trans-1,2-diaminocycloalkyl-N,N,$N^1$,$N^1$-tetraacetic acid; diethylenetriaminepentaacetic acid; ethylenebis (oxyethylenenitrilo) tetraacetic acid, cis-or trans- 1,4-diaminocycloalkyl-N,N,$N^1$,$N^1$-tetraacetic acid, bis-hexamethylenetriamine pentaacetic acid, hexamethylenediaminetetraacetic acid, tris-(2-aminoethyl) amine-hexaacetic acid, iminodiacetic acid, and the like.

The cis-or trans-1,2-diaminocycloalkyl-N,N,$N^1$,$N^1$-tetraacetic acid can be either or a combination of cis-or trans 1,2-diaminocyclo-heptane-N,N,$N^1$,$N^1$-tetraacetic acid, cis-or trans-1,2-diaminocyclo-pentane-N,N,$N^1$,$N^1$-tetraacetic acid, cis-or trans-1,2-diaminocyclo-hexane-N,N,$N^1$,$N^1$-tetraacetic acid, or mixtures thereof.

The cis-or trans-1,4-diaminocycloalkyl-N,N,$N^1$,$N^1$-tetraacetic acid can be with a combination of cis-or trans 1,4-diaminocyclo-heptane-N,N,$N^1$,$N^1$-tetraacetic acid, cis-or trans-1,4-diaminocyclo-pentane-N,N,$N^1$,$N^1$-tetraacetic acid, cis-or 1,4-diaminocyclo-hexane-N,N,$N^1$,$N^1$-tetraacetic acid, or mixtures thereof.

The amount of stabilizer to be used to stabilize the hydroxylamine or the at least partially neutralized hydroxylamine salt solution ranges from about 0.01 to about 0.1 percent by weight of composition. Preferably, the amount of stabilizer ranges from about 0.005 to about 0.025%, (50–250 ppm) same basis.

COMPARATIVE EXAMPLE I

Example of Consequences of Using KOH/NaOH

A fiberglass/P.E. column of Purolite A-400 resin (i.e.: ~2.0 $ft^3$) was regenerated using 10% KOH solution following exhaustive anion removal from several thousand pounds of 50% aqueous hydroxylamine (HA). The regeneration of the anion resin included in order of performance the following steps:

a) DI water flush of residual 50% HA(~200 gal DI water used) until % HA=0.0% by acid-base titration.

b) Flush resin with ~500 gal 10% KOH solution to exchange all anions bound to A-400 resin with ($OH^-$).

c) Flush resin with ~1000 gal DI water until pH=7.0 and until (K+) level by ICP testing is below 10 ppb.

d) Flush with 10% $NH_4OH$ solution (Cleanroom grade from Ashland Chemical Co.) to ensure removal of all metals and anions prior to I.E. run with 50% (HA).

Results: Inductively coupled Plasma (ICP) test runs of final 10% $NH_4OH$ solution flush of regenerated anion resin gave the following results:

| Element | ppb |
| --- | --- |
| K | 5100 |
| Na | 200 |

Conclusion:

1. Regeneration of exhausted anion resin (A400-OH) using 10% KOH solution results in a large amount of refractory potassium ion which is not washed away during the DI water rinse following the 10% KOH regeneration.

2. Removal of this refractory potassium ion requires a mild to strong base that, if not used, will severely contaminate the basic 50% hydroxylamine when run through such a regenerated resin.

COMPARATIVE EXAMPLE II

Examples of Pretreatment Process Improvement Using DI water Flush Only

Two polyethylene/fiberglass cylinders containing ~0.25 ft$^3$ of new Purolite (A400-OH) anion resin in each were conditioned or pretreated as follows:

a) Cylinder #1 was pre-treated as described in Comparative Example I
   (1) Flush resin with about 10–20 gal of 10% KOH solution to ensure all active resin sites are in the basic (OH$^-$) form.
   (2) Flush conditioned resin with about 25–30 gal DI water until pH ~7.0 and until (K$^+$) level by ICP testing is below 10 ppb.
   (3) Blow out excess cylinder DI water with N$_2$.
b) Pretreatment of cylinder #2
   (1) Flush resin with about 15–20 gal of DI water until ICP tests show all trace metals less than 15–20 ppb.
   (2) Blow out cylinder's DI water with N$_2$.

Results:

50% hydroxylamine (HA) purchased from Nissin Chemical Co. was ion exchanged through each of cylinders #1 and #2 directly following cation exchange through conditioned and pre-tested Purolite CT-151 cation resin. The effectiveness of the pre-treatment in the face of resin exposure to the mild base (HA), is measured by ICP testing of critical metals. Results obtained are indicated in the table:

| | ICP TEST RESULTS IN ppb | | |
|---|---|---|---|
| Element | Raw Nissin HA | Cylinder #1 (I.E. | Cylinder #2 (I.E. |
| Al | 443 | 4 | 7 |
| Ca | 40 | 11 | <1 |
| Cr | 67 | 1 | 2 |
| Fe | 293 | 370 | <1 |
| K | 225 | >620 | 1 |
| Si | 1875 | 155 | 131 |
| Na | 135 | 190 | 1 |

Conclusions:

Results show that when fresh (new) A400-OH anion resin is pretreated with KOH (10%) prior to use, that even after extensive water rinsing to remove all traces of residual KOH, (i.e. Cylinder #1) and after cation exchange of 50% hydroxylamine to remove initial (K$^+$) and (Na$^+$) from raw Nissin material, hydroxylamine run through the anion cylinder so treated actually picks up (K$^+$) and (Na$^+$) not removed by the DI water rinse of the 10% KOH pretreatment. However, cation exchanged Nissin HA run through the simple DI water pretreated (A400-OH) anion resin (i.e. Cylinder #2) shows no (K$^+$) or (Na$^+$) pick up at all showing clearly that pretreatment or conditioning of new resin with (KOH) or (NaOH) is actually detrimental to the performance of the anion resin and overall trace metal purity of hydroxylamine run through such a pretreated resin.

EXAMPLE 2

Raw 50% hydroxylamine from Nissin Chemical is ion exchanged as in Example 1 using conditioned, pretested CT-151 cation resin in a 2.5 ft$^3$ polyethylene/fiberglass cylinder. Both the exchanged 50% hydroxylamine collected and the 50% hydroxylamine remaining in the cylinder showed excellent stability over 10 days according to the following data table:

| HA Material | # Days | Cylinder Temp. | % HA Measured | Trace Elements | |
|---|---|---|---|---|---|
| | | | | Na | K |
| Virgin Nissin 50% HA | — | — | 50.6% | 115 | 226 |
| Cation Exchanged (HA) Cation | 0 | Ambient | 50.5% | <1 | <1 |
| Cylinder (HA) Cation | 0 | Ambient | 50.5% | — | — |
| Cylinder (HA) Cation | 5 | Ambient | 50.45% | — | — |
| Cylinder | 10 | Ambient | 50.55% | — | — |
| Cation Exchanged | 5 | Ambient | 50.4% | 4 | 3 |
| Cation Exchange | 10 | Ambient | 50.6% | 5 | 5 |

Additionally, hydroxylamine remaining in the cation cylinder retained ambient temperature throughout the time period. Also assay tests showed that little or no hydroxylamine decomposition had occurred. Temperature was monitored using a special thermocouple monitor system attached to the outside of the resin cylinder.

EXAMPLE 3

Nissin 50% hydroxylamine which had been cation exchanged more than 60 days previously was ion exchanged as in Example 2 using DI water conditioned and pretested (A400-OH) anion resin set up as in Example I. Both the exchanged 50% hydroxylamine collected and the 50% hydroxylamine remaining in the anion resin cylinder showed excellent stability over at least seven days according to the following data table:

| HA Material* | # Days | Cylinder Temp. | % HA Measured | Trace Elements * ppb | | | | | |
|---|---|---|---|---|---|---|---|---|---|
| | | | | Na | K | Ca | Cr | Fe | Al |
| Cation Exchanged HA (CX-1) | — | | 50.9%* | 4 | 8 | 54 | 89 | 370 | 490 |
| Anion Exchanged (CX-1) | 0 | | 50.9%* | 4 | 8 | 1 | 25 | 4 | 5 |
| Anion Exchanged (CX-1) | 5 | | 50.8%* | — | — | — | — | — | — |
| Anion Exchanged (CX-1) | 7 | | 50.8%* | — | — | — | — | — | — |
| (HA)-Anion Cylinder | 0 | Ambient | 50.8%* | — | — | — | — | — | — |
| (HA) Anion Cylinder | 1 | Ambient | | | | | | | |
| (HA) Anion Cylinder | 3 | Ambient | — | | | | | | |
| (HA) Anion Cylinder | 7 | Ambient | 50.7%* | | | | | | |

*Values are averages of several (≦10) runs/measurements

As in Example I, resin cylinder temperature, as monitored by a thermocouple/monitor system, showed retention of ambient temperature throughout the test period further indicating no noticeable hydroxylamine decomposition.

COMPARATIVE EXAMPLE III

Virgin (Raw) Nissin Chemical 50% hydroxylamine was ion exchanged through both cation and anion cylinders in the order:

1) Anion Exchange; and then

2) Cation Exchange

The cylinder system used was the same as that in Comparative Example 1 for each of the cation and anion resin cylinders. Both cylinders contained fresh resins which have been properly conditioned and pretreated followed by full ICP testing to ensure integrity. Purolite (CT-151) resin was used as the cation resin and Purolite (A400-OH) was used as the anion resin.

Following the double-exchange of the Nissin material in the order described above, the hydroxylamine contained in the anion and cation cylinders was left to stand using a temperature monitoring system. The table below illustrates the results of this ion exchange permutation:

| No. Days Anion Cylinder HA | Anion Cylinder Temperature | No. Days Cation Cylinder HA | Cation Cylinder Temperature |
|---|---|---|---|
| 0 | Ambient | 0 | Ambient |
| 1.5 | Ambient | 1 | Ambient |
| 2 | Ambient | 1.5 | Ambient |
| 2 | Ambient | 2 | >250° C.* |

*Cation cylinder temperature was checked @ 4:00 PM and measured ambient (i.e. ~64° F.). From 9:00 PM to 12:00 (midnight) temperature rose exponentially to well over 250° C. The pressure from the rapid, yet delayed hydroxylamine decomposition vaporized both the hydroxylamine and cation resin resulting in a catastrophic explosion of the cylinder head.

Anion cylinder temperature remained at ambient throughout the testing period and beyond. Only the hydroxylamine within the cation resin cylinders showed the observed catastrophic and explosive decomposition and heat build up.

EXAMPLE 4

The ion exchange system was set up as in Comparative Example II except this time, the order of double ion exchange is cation exchange first followed by anion exchange second. Exchange was done in direct series and with no delay between cation and anion runs.

Following the double-exchange of the Nissin 50% hydroxylamine in the above order, the hydroxylamine again, contained in the anion and cation cylinders is left to stand using the above described temperature monitoring system. The table below illustrates the results of this ion exchange permutation:

| No. Days Anion Cylinder HA | Anion Cylinder Temperature | No. Days Cation Cylinder HA | Cation Cylinder Temperature |
|---|---|---|---|
| 0 | Ambient | 0 | Ambient |
| 1 | Ambient | 1 | Ambient |
| 3 | Ambient | 3 | Ambient |
| 7 | Ambient | 7 | Ambient |

Even after nearly four times longer standing than in Comparative Example II, the hydroxylamine contained in each cylinder remained stable and without decomposition and without the associated massive heat and pressure build up.

Conclusions:

Hydroxylamine solutions which have been stabilized against decomposition with typical, effective stabilizers must follow the ion exchange permutation given as cation then anion for double exchanged material, or risk explosive decomposition within the cation resin.

Hydroxylamine which has been anion exchanged only should not be re-exchanged through cation resin, even after a prolonged period as this still constitutes an exchange permutation of "anion then cation."

The anion exchange system will effectively remove all acid type or base type stabilizer from the hydroxylamine solution. It is highly suggested the hydroxylamine be re-stabilized following anion exchange, especially if the hydroxylamine material is to be stored for extended periods (i.e. weeks or months).

Rapid and explosive decomposition of hydroxylamine exchanged by the "anion-cation" permutation occurs only after 36–48 hours and almost exclusively within the cation resin cylinder. There has been, however, one observed incident of heated, pressure build-up decomposition within the anion resin system, but this occurred near the exhaustion point of the resin where the entrapped levels of multi-valent metals (i.e. Fe, Ni, Cu, Mn et al) that function as hydroxylamine decomposition catalysts were high. Hydroxylamine remaining in the resin cylinder will be in contact with these rein entrapped metals in the midst of a high surface area of contact. It is believed these two parameters (i.e. high surface area contact plus high levels of catalytic multi-valent metals) were the cause of the anion cylinder (HA) rapid decomposition after ~12–24 hours of standing.

What is claimed is:

1. A method for the purification of hydroxylamine which comprises the steps of:

A. passing an aqueous solution of hydroxylamine through at least one macroporous or gel strong acid cation exchange resin bed which has been treated with a dilute solution of hydrochloric acid to convert all active resin sites to the acid form, and then B. passing the solution from Step A through at least one strong base anion exchange resin bed that has been treated or regenerated with a non-metal amino or hydroxide base solution to convert all active resin sites to the hydroxyl basic form.

2. The method of claim 1 wherein about 3 to 20% hydrochloric acid solution is used in Step A in treating the resin.

3. The method of claim 1 wherein a said non-metal amino hydroxide base solution comprises a compound selected from the group consisting of alkanolamine, ammonium hydroxide and tetraalkylammonium hydroxide.

4. The method of claim 1 wherein said resin of Step A is a strong acid polystyrene resin.

5. The method of claim 1 wherein said resin of Step B is a strong base polystyrene resin cross-linked with divinylbenzene.

6. The method of claim 1 wherein said hydroxylamine solution comprises about 5 to 20% by weight of hydroxylamine.

7. The method of claim 6 including the subsequent step of passing an about 50% by weight hydroxylamine solution through said resins.

8. The method of claim 1 wherein said hydroxylamine solution is passed through a multiple of resin beds in Step A.

9. The method of claim 1 including the addition of a hydroxylamine stabilizer.

10. The method of claim 1 wherein said hydroxylamine solution from Step A is passed through a multiple of resin beds in Step B.

11. A method for the purification of hydroxylamine which comprises the steps of:

a) forming a multiplicity of strong acid ion exchange beds;

b) forming a multiplicity of strong base ion exchange beds;

c) treating the strong acid ion exchange beds with a dilute hydrochloric acid solution;

d) treating the strong base ion exchange beds with a solution of ammonium hydroxide or tetramethylammonium hydroxide;

e) passing an aqueous solution containing about 5 to 20% by weight of hydroxylamine through said strong acid and cation exchange beds; and then f) passing an aqueous solution containing about 50% by weight of hydroxylamine through said strong acid and strong base ion exchange beds.

12. The method of claim 11 including the addition of a hydroxylamine stabilizer.

13. The method of claim 12 wherein said stabilizer is selected from the group consisting of cis-or trans-1,2-diaminocycloalkyl-N,N,$N^1$,$N^1$-tetraacetic acid; cis-or trans-1,4-diaminocycloalkyl-N,N,$N^1$,$N^1$-tetraacetic acid; ethylenebis (oxyethylenenitrilo) tetraacetic acid, bis-hexamethylenetriamine pentaacetic acid, hexamethylenediaminetetraacetic acid, tris (2-aminoethyl) aminehexaacetic acid, iminodiacetic acid, and a mixture thereof.

14. The method of claim 11 including the step of treating unused strong base ion exchange bed with deionized water.

* * * * *